D. SHUMWAY.
VEHICLE WHEEL.
APPLICATION FILED MAY 18, 1917.
1,249,678.
Patented Dec. 11, 1917.
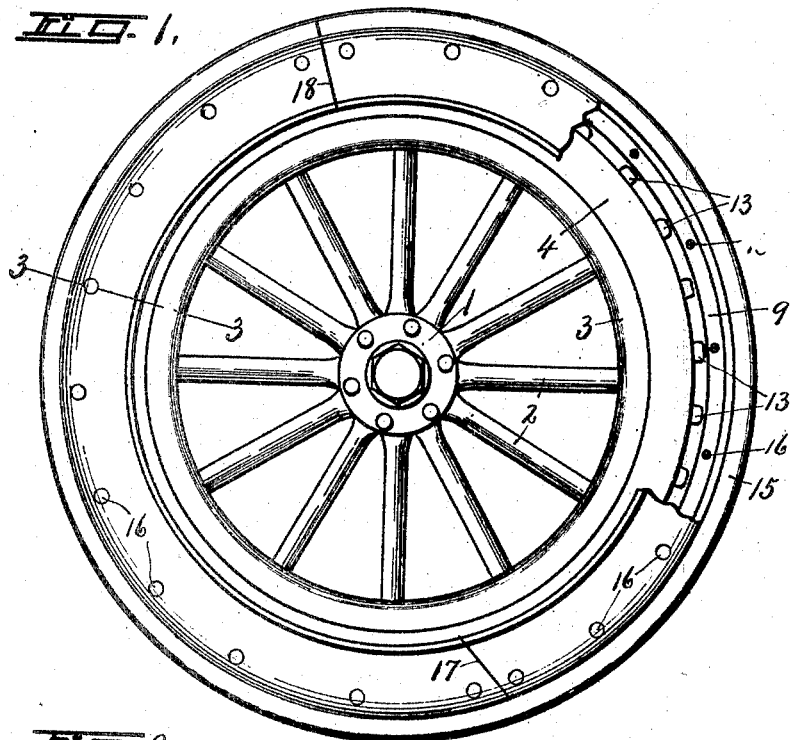
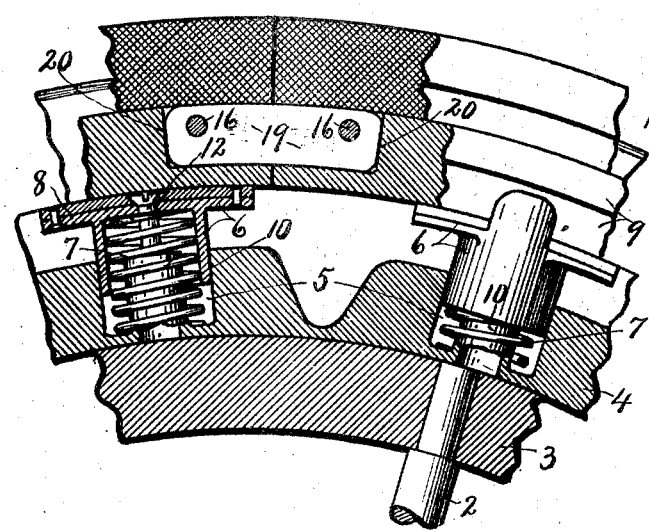
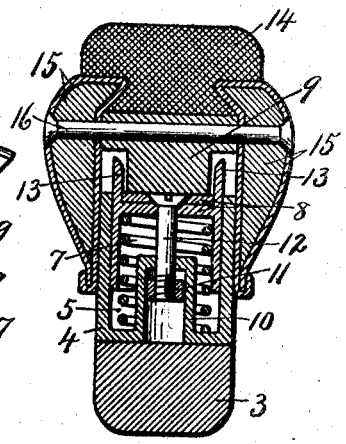
WITNESSES:
H. V. Furst.
INVENTOR
D. Shumway
BY Howard P. Denison
ATTORNEY

UNITED STATES PATENT OFFICE.

DORA SHUMWAY, OF OVID, NEW YORK, ASSIGNOR OF ONE-HALF TO ORVILLE W. BROWN, OF ROMULUS, NEW YORK.

VEHICLE-WHEEL.

1,249,678.  Specification of Letters Patent.  Patented Dec. 11, 1917.

Application filed May 18, 1917. Serial No. 169,499.

*To all whom it may concern:*

Be it known that I, DORA SHUMWAY, a citizen of the United States of America, and resident of Ovid, in the county of Seneca, in the State of New York, have invented new and useful Improvements in Vehicle-Wheels, of which the following, taken in connection with the accompanying drawings, is a full, clear, and exact description.

This invention relates to certain improvements in vehicle wheels of the yielding rim type adapted to afford sufficient resiliency to take the place of the usual pneumatic tire, and at the same time providing suitable clencher rings for the reception and retention of a flexible tread of rubber, leather or other suitable material.

One of the objects is to provide a vehicle wheel of this character in which the tire may closely resemble the ordinary pneumatic tire without the use of any pneumatic tubes or compartments, at the same time maintaining a degree of resiliency sufficient to prevent the transmission of vibrations to the felly in passing over uneven road surfaces.

Another object is to provide the wheel with comparatively light internal and external rims and interposed spring-distended plungers supporting the outer rim and telescoping with sockets in the inner rim to afford the necessary resiliency, and at the same time to guide the rims in their relative radial movement throughout their circumferential lengths.

A further object is to provide the outer rim with removable clencher rings for receiving and retaining a tread or shoe thereon, and also to utilize portions of the clencher rings to coöperate with the inner rim in holding the outer rim and its shoe or tread in the same plane of rotation as the felly and inner rim.

A still further object is to divide the outer rim and its clencher rings and shoe through diametrically opposite sides and to connect their adjacent ends by locking members, the other of which may constitute a hinge to allow the opposite halves to be opened from one side about the hinge at the opposite side, thereby facilitating the placing of the opposite halves of the tire upon the outer ends of the spring-distended plungers.

Other objects and uses relating to specific parts of the wheel will be brought out in the following description.

In the drawings—

Figure 1 is a side elevation of a vehicle wheel embodying the features of my invention, except that a portion of one of the clencher rings is broken away.

Fig. 2 is an enlarged longitudinal sectional view of a portion of the felly, inner rim and tire showing one of the plungers in elevation and the other in section.

Fig. 3 is an enlarged transverse sectional view through the felly, rim and tire taken on line 3—3, Fig. 1.

As illustrated, this wheel comprises a hub —1— having radial spokes —2— connected at their outer ends to a felly —3—, upon which is mounted an inner rim —4—.

The rim —4— is provided with a series of radial sockets —5— in uniformly spaced relation circumferentially for receiving a corresponding number of radial plungers —6— which are spring pressed outwardly by coil springs —7— and are provided with circumferentially elongated outer ends or heads —8— forming seats for receiving and supporting an outer rim —9—.

The reduced portions of the plungers —6— are cylindrical and hollow and telescope within the sockets —5—, the springs —7— having their inner ends seated in their respective sockets, and their outer ends seated in the corresponding sockets in the cylindrical portions of the plungers and are, therefore, protected from external elements.

The inner rim —4— is also provided with hollow bosses —10— projecting radially and centrally into the sockets —5— for receiving nut pistons —11— which are engaged by screw rods —12— passed outwardly through reduced openings in the outer ends of the bosses —10— and attached to the heads —8— of the plungers —6— to not only additionally cushion the inward movement of the outer rim by the action of the pistons —11— in their respective bosses —10—, but also to limit both the inward and outward movement of both rims relatively to each other.

The screws —12— and their nuts —11— also permit the corresponding portions of the rims to be adjusted radially to bring them into exact concentricity, it being understood that the springs —7— are tensioned to a sufficient degree to force the adjacent portions of the rims apart to the limit of their separating movements, as determined by the engagement of the nuts —11— with the outer ends of the bosses —10— under normal or light load.

The outer ends of the plungers —6— are provided with opposite outwardly projecting flanges —13— in spaced relation to receive the adjacent portion of the outer rim —9— between them and to assist in holding said outer rim against lateral displacement from the heads —9— of the plunger —6—, as shown more clearly in Fig. 3.

The outer rim —9— is preferably T-shape in cross section and arranged with its reduced portion between the flanges —13— and the opposite sides of its opposite wider portions overhanging said flanges in radially spaced relation thereto so as to allow a limited radial movement of both the inner and outer rims relatively to each other.

The periphery of the rim —9— is substantially flat transversely for receiving and supporting a flexible tread or shoe —14— of rubber, leather or equivalent material which is also substantially T-shape in cross section, the inner side thereof being of substantially the same width as that of the periphery of the rim —9—.

The opposite edges of the tread or shoe —14— are provided with V-shape annular grooves for receiving the adjacent outer edges of a pair of oppositely disposed clencher rings —15— which are clamped to the opposite sides of the outer rim —9— by bolts —16—, as shown more clearly in Fig. 3, said bolts being passed through registering apertures in the rings and outer rim.

The outer rim —9— and its clencher rings —15—, together with the tread or shoe —14—, constitute the tire, all of said parts being divided at —17— and —18— through diametrically opposite sides to permit the tire to be placed over and upon the outer ends of the plungers —6— between the flanges —13—, after which their meeting ends are firmly connected together by tie-pieces —19— having apertures for receiving the adjacent bolts —16— which are seated in grooves or slots —20— of substantially the same size as the tie-pieces and it, therefore follows that if one of the bolts —16— at each side of the tire is removed, the half sections may be separated, or if one of the bolts is removed at one side, the sections may be rocked about the axes of the bolts at the opposite side, either of which operations may be employed in placing the tire upon the outer ends of the plungers, said bolts also serving to permit the removal of either one of the clencher rings in placing the shoe or tread —14— upon or removing it from the outer rim.

The hub, spokes and felly may be of any desired construction, the inner rim —4— being fitted tightly upon the periphery of the felly and secured thereto by any suitable fastening means not necessary to herein illustrate or describe.

The springs —7— are then placed over and upon the bosses —10— within the sockets —5— and secured in place by the bolts —12— and nuts —11— which are adjusted to bring the heads of the plungers —6— into concentricity with the inner rim —4—, after which the tire sections including the inner rim —9— may be placed over and upon the outer ends of the plungers between the flanges —13— and properly fastened together by the tie-pieces —19—, whereupon the wheel is ready for use.

What I claim is:

1. In a vehicle wheel, the combination of an inner rim and a series of radial plungers spaced uniform distances apart circumferentially relatively to the inner rim, said rim and plungers having telescoping parts, coil springs between the rim and plungers and normally tensioned to force the latter outwardly, said rim and plungers having coöperative means for limiting their relative radial movement, and an outer rim seated upon the outer ends of the plungers.

2. In a vehicle wheel, the combination of an inner rim and a series of radial plungers spaced uniform distances apart circumferentially relatively to the inner rim, said rim and plungers having telescoping parts, coil springs between the rim and plungers and normally tensioned to force the latter outwardly, said rim and plungers having coöperative means for limiting their relative radial movement, an outer rim seated upon the outer ends of the plungers, said outer rim being divided through diametrically opposite sides, and means for locking the adjacent ends of the opposite half sections of the rim to each other.

3. In a vehicle wheel, the combination of an inner rim, and a series of radial plungers spaced uniform distances apart circumferentially relatively to the inner rim, said rim and plungers having telescoping parts, coil springs between the rim and plungers and normally tensioned to force the latter outwardly, said rim and plungers having coöperative means for limiting their relative radial movement, an outer rim seated upon the outer ends of the plungers, a tread mounted upon the periphery of the outer rim, and clencher rings secured to opposite sides of the outer rim and engaged with the opposite edges of the tread to retain the latter in place, said rings extending inwardly against opposite faces of the inner rim.

In witness whereof I have hereunto set my hand this tenth day of May, 1917.

DORA SHUMWAY.

Witnesses:
 CYRUS SHUMWAY,
 BENJAMIN FRANKLIN.

Copies of this patent may be obtained for five cents each, by addressing the "Commissioner of Patents, Washington, D. C."